(12) United States Patent
Zhang (10) Patent No.: US 8,339,098 B2
(45) Date of Patent: *Dec. 25, 2012

(54) BATTERY CHARGER WITH RETRACTABLE CONTACTS

(75) Inventor: Shuai Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 273 days.

This patent is subject to a terminal disclaimer.

(21) Appl. No.: 12/822,267

(22) Filed: Jun. 24, 2010

(65) Prior Publication Data

US 2011/0241605 A1 Oct. 6, 2011

(30) Foreign Application Priority Data

Mar. 31, 2010 (CN) .......................... 2010 1 0137033

(51) Int. Cl.
*H01M 10/46* (2006.01)

(52) U.S. Cl. ...................................................... 320/114
(58) Field of Classification Search .................. 320/107, 320/111, 112, 114, 115
See application file for complete search history.

(56) References Cited

U.S. PATENT DOCUMENTS 8,022,667 B2 * 9/2011 Anderson ..................... 320/109
2011/0241606 A1 * 10/2011 Zhang ........................... 320/107

* cited by examiner

*Primary Examiner* — Edward Tso
(74) *Attorney, Agent, or Firm* — Altis Law Group, Inc.

(57) ABSTRACT

A battery charger includes a housing, at least two contacts, a transmission mechanism, and a driving member. The housing defines a slot and through holes. The at least two contacts are received in the housing and are operable to protrude out of the housing after passing through the through holes. The transmission mechanism is received in the housing and is for driving the at least two contacts to protrude out of the housing. The driving member is received in the housing and partially extends out of the housing after passing through the slot. The driving member is capable of sliding in the slot and activating the transmission mechanism.

20 Claims, 7 Drawing Sheets

BATTERY CHARGER WITH RETRACTABLE CONTACTS

BACKGROUND

1. Technical Field

The present disclosure relates to battery chargers, and particularly to a cell phone battery charger having retractable contacts.

2. Description of Related Art

A cell phone battery charger often includes spring contacts external to its housing. To charge a battery, the charger can first be connected to a power source, and then the battery is placed on the charger. The external contacts of the charger or the battery may be short-circuited when conductive objects make contact with them, subsequently this may damage the charger or the battery.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiment of a battery charger with retractable contacts. Moreover, in the drawings, like reference numerals designate corresponding parts throughout several views.

DETAILED DESCRIPTION

Embodiments of the present disclosure will now be described in detail with reference to the drawings.

Figure 1:
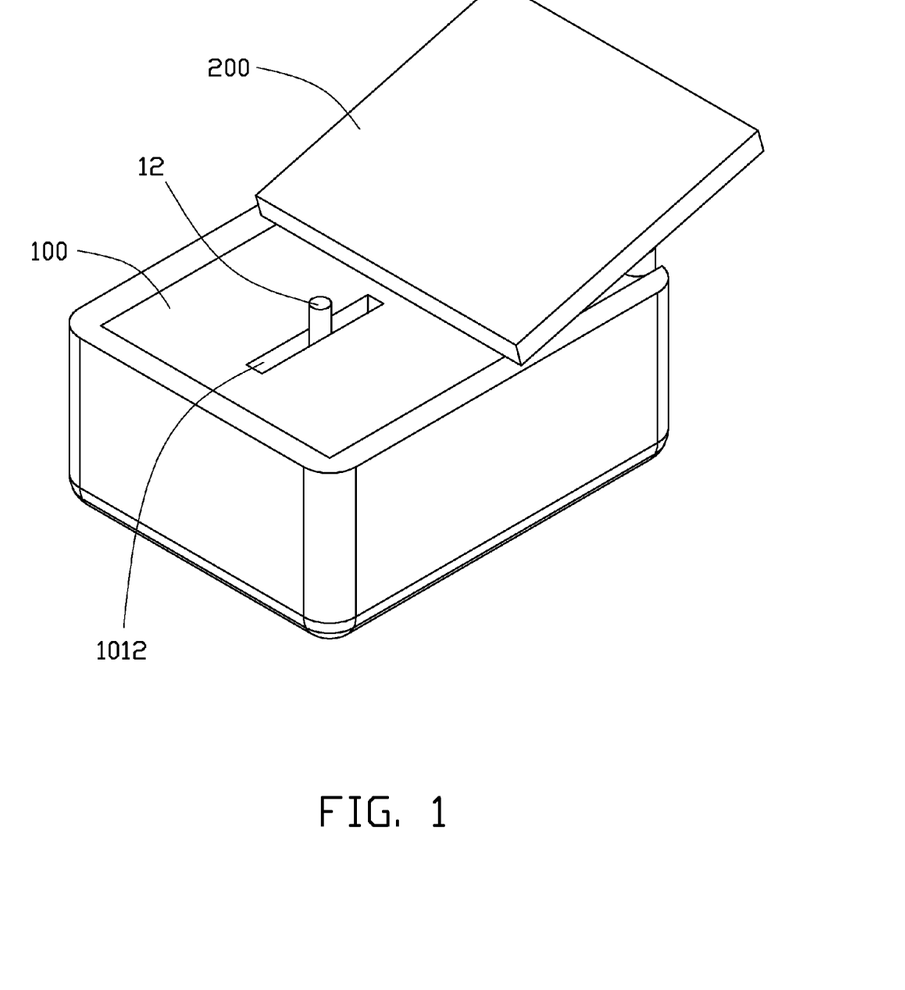
FIG. 1 is an isometric, schematic view of a battery charger and a battery according to an exemplary embodiment.
Figure 2:
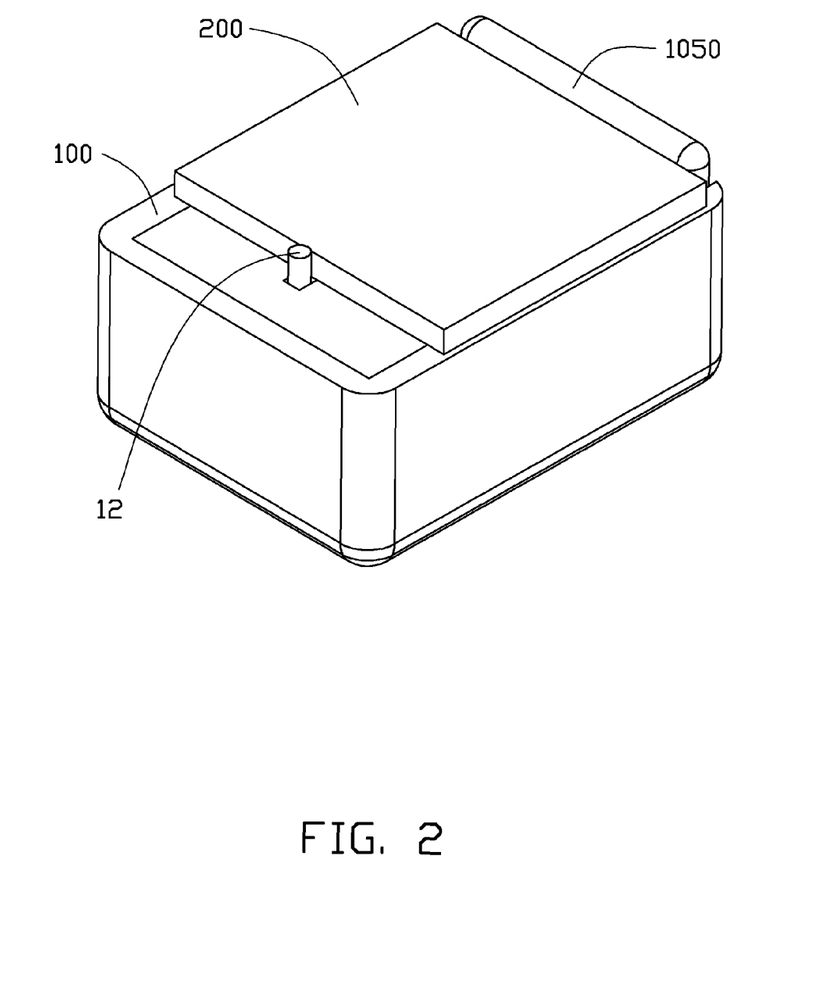
FIG. 2 is similar to FIG. 1, but showing the battery charger and the battery in another state.

Referring to FIGS. 1 and 2, a battery charger 100 according to an exemplary embodiment is illustrated. The battery charger 100 is used for charging a battery 200. In this embodiment, the battery 200 is used for a cell phone. In other embodiments, for example, the battery 200 may be used for charging the batteries of other electronic such as a digital camera.

Figure 3:
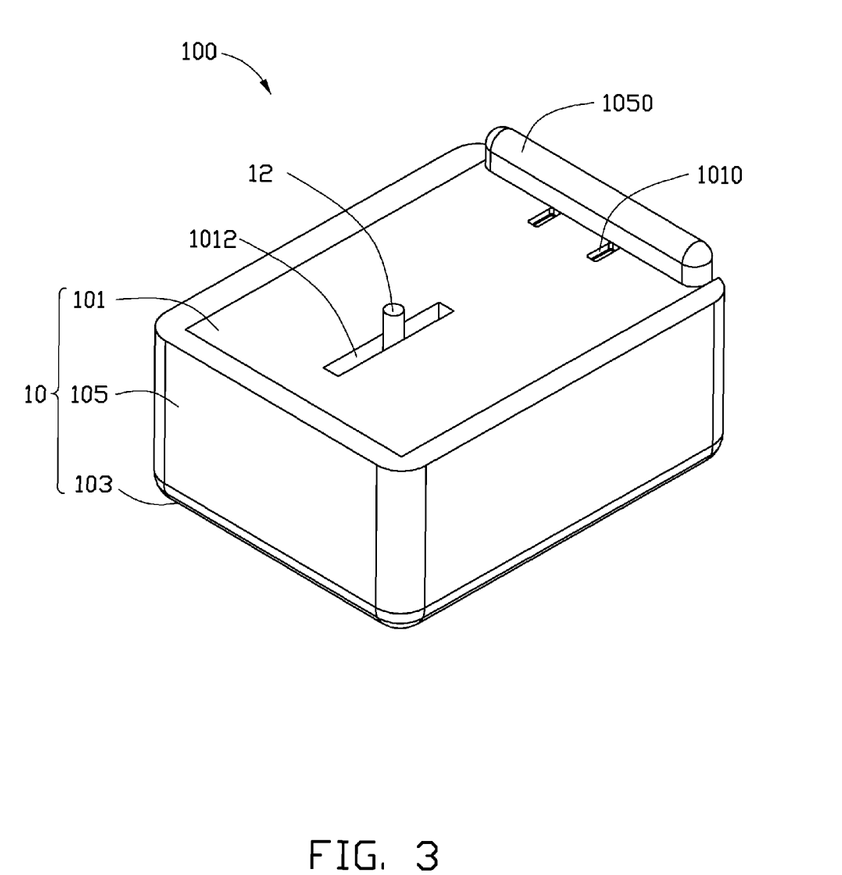
FIG. 3 is an isometric, schematic view of the battery charger of FIG. 1.
Figure 4:
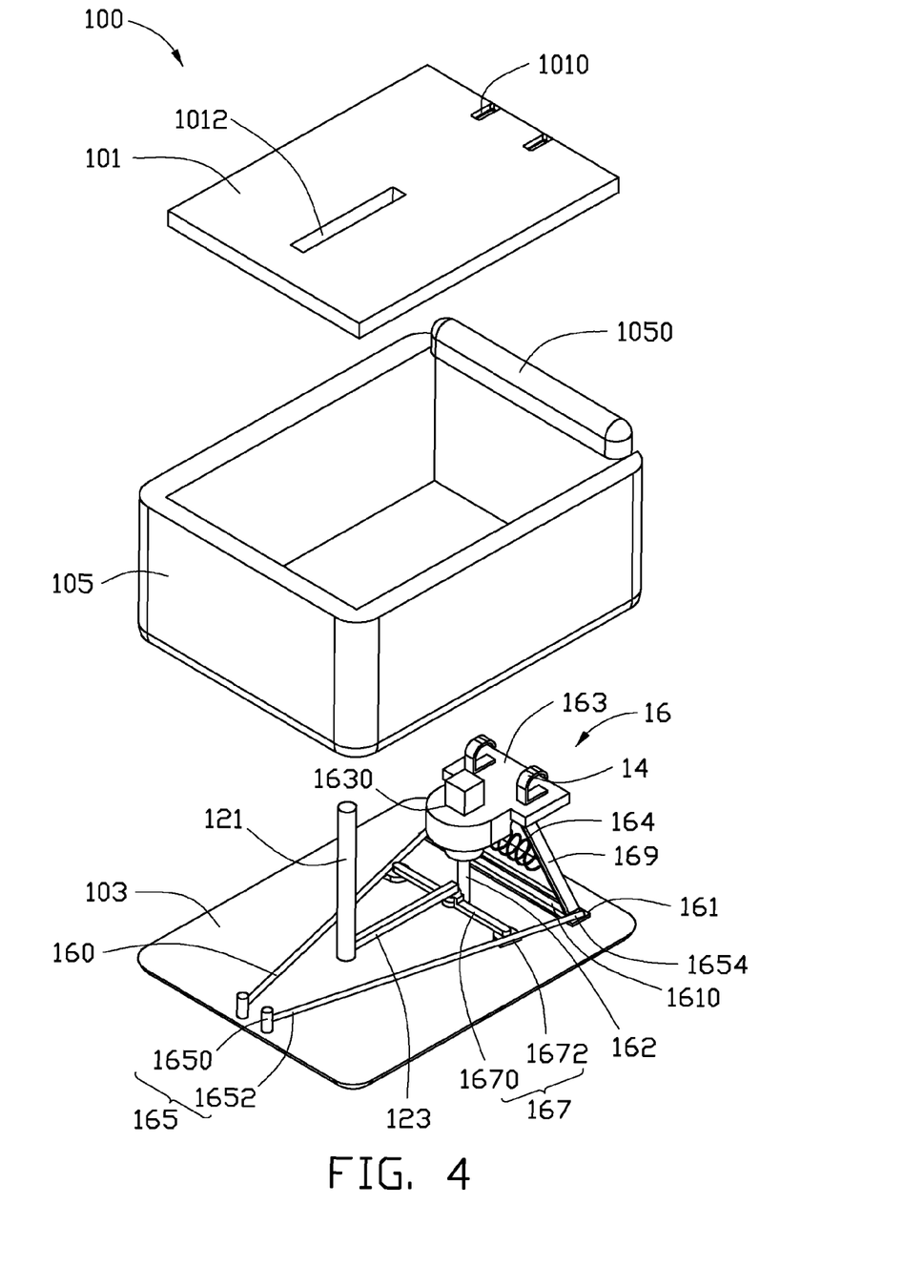
FIG. 4 is an exploded view of the battery charger of FIG. 3.

Referring to FIGS. 3 and 4, the battery charger 100 includes a housing 10, a driving member 12, contacts 14, and a transmission mechanism 16. The housing 10 is used for receiving the driving member 12, the contacts 14, and the transmission mechanism 16. The driving member 12 is used for driving the transmission mechanism 16 to drive the contacts 14 to protrude out of the housing 10.

The housing 10 includes a top wall 101, a bottom wall 103 parallel to the top wall 101, and a side wall 105 connecting the top wall 101 to the bottom wall 103. The top wall 101, the bottom wall 103, and the side wall 105 are cooperative to define a receiving room in the housing 10. Thus, the housing 10 can receive the driving member 12, the contacts 14, and the transmission mechanism 16.

The top wall 101 defines a slot 1012 and through holes 1010. The slot 1012 is substantially rectangular and is defined through the top wall 101. The side wall 105 includes a protrusive board 1050. The protrusive board 1050 extends from the side wall 105 and protrudes out of the top wall 101. The protrusive board 1050 is substantially perpendicular to the top wall 101. In this embodiment, the protrusive board 1050 extends from the top edge of the side wall 105.

The driving member 12 includes a rocker 121 and a connecting portion 123. One end of the rocker 121 is positioned on the bottom wall 103, and the other end of the rocker 121 protrudes out of the top wall 101 after passing through the slot 1012. The rocker 121 is slidable in the slot 1012. One end of the connecting portion 123 is connected to the end of the rocker 121 positioned on the bottom wall 103, and the other end of the connecting portion 123 is connected to the transmission mechanism 16.

The transmission mechanism 16 includes a guiding member 162, a platform 163, and a transmission assembly 160. The contacts 14 rest on the top of the platform 163. The transmission assembly 160 is used for driving the platform 163 to actuate along the guiding member 162 subsequently bringing the contacts 14 in and out of the housing 10.

The platform 163 defines a channel 1630 through the platform 163. The contacts 14 are fixed on the platform 163. When the platform 163 contacts the top wall 101, the contacts 14 protrude out of the top wall 101 from the corresponding through holes 1010 to make electrical contact with the battery 200.

One end of the guiding member 162 is fixed on the bottom wall 103, and the other end of the guiding member 162 is inserted in the channel 1630 and is capable of sliding the platform 163 in cooperation with the channel 1630. In order to prevent the platform 163 from sliding to the bottom wall 103, the radius of the middle portion of the guiding member 162 is greater than that of the inserted end of the guiding member 162.

The transmission assembly 160 includes a frame 161, an elastic member 164, a first transmission member 165, a second transmission member 167, and two third transmission members 169. The second transmission member 167 is driven by the driving member 12 to drive the first transmission member 165. The two third transmission members 169 are driven by the first transmission member 165 to drive the platform 163 to raise or lower along the guiding member 162.

The frame 161 is used for guiding the two third transmission members 169. The frame 161 is attached to the bottom wall 103. The frame 161 defines a recess 1610 to receive and guide the two third transmission members 169. The guiding member 162 is substantially perpendicular with the frame 161, and is on a centerline of the frame 161.

The first transmission member 165 includes two fixing portions 1650 and two rotatable rods 1652. The two fixing portions 1650 are fixed on the bottom wall 103. The line defined by the two fixing portions 1650 is substantially parallel to the frame 161. Ends of the two rotatable rods 1652 are fixed on the two fixing portions 1650 respectively, and the other two ends of the rotatable rods 1652 are positioned on the two third transmissions 169 respectively. The two rotatable rods 1652 are capable of rotating with respect to the corresponding fixing portions 1650. The driving member 12 is located between the two rotatable rods 1652, and further between the two fixing portions 1650 and the guiding member 162.

The second transmission member 167 includes two transmission parts 1670 and two connecting parts 1672. Ends of the two transmission parts 1670 rotatably connect with the connecting portion 123 of the driving member 12 respectively. The other ends of the two transmission parts 1670 rotatably connect with the two connecting parts 1672 respectively. The two connecting parts 1672 are fixed on the two rotatable rods 1652 of the first transmission member 165 respectively.

In this embodiment, the two third transmission members 169 are two rotatable brackets. Ends of the two third transmission members 169 are rotatable connected to the platform 163, and the other ends of the two third transmission members 169 are moveably received in the recess 1610 of the frame 161. The two third transmission members 169 are located between the two rotatable rods 1652 of the first transmission member 165. The elastic member 164 is connected between the two third transmission members 169. The two third transmission members 169 can be pushed by the two rotatable rods 1652 to move next to each other.

Figure 5:
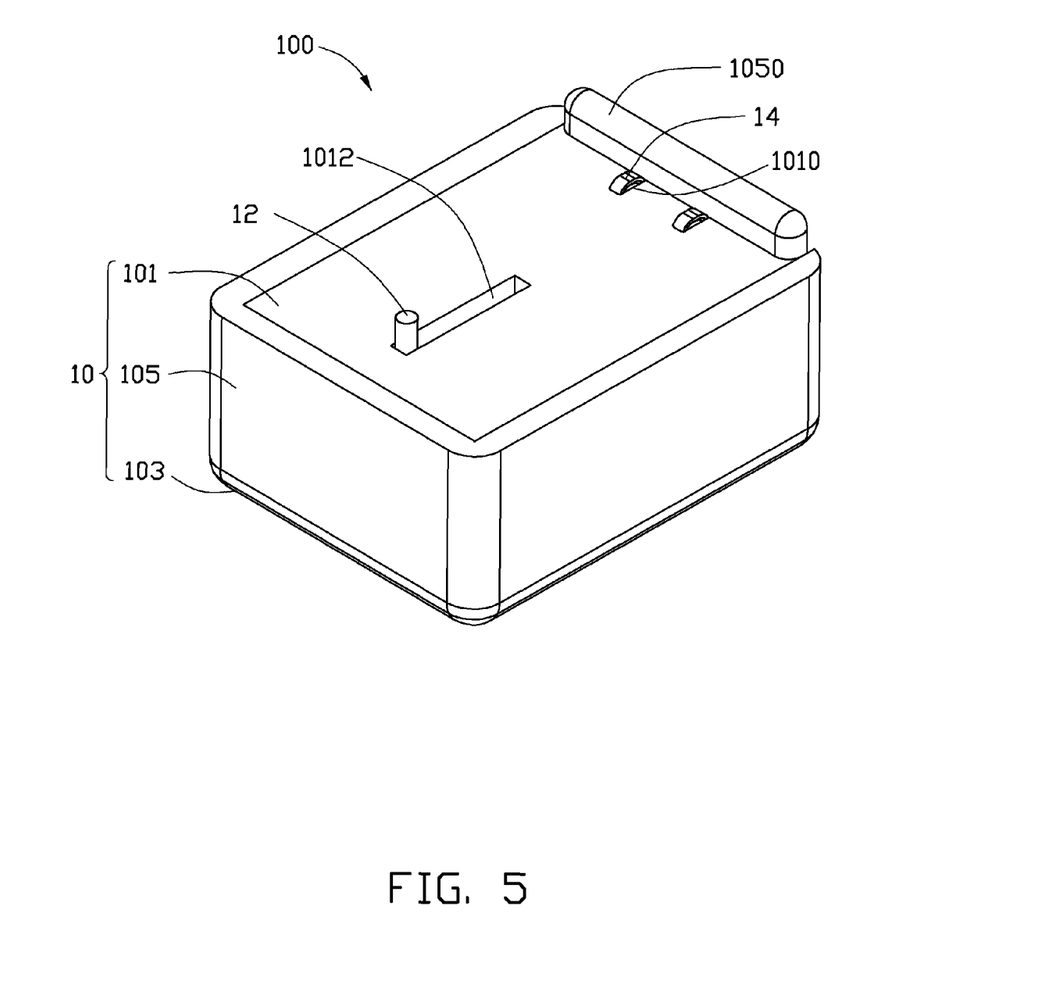
FIG. 5 is similar to FIG. 3, but showing the battery charger in another state.
Figure 6:
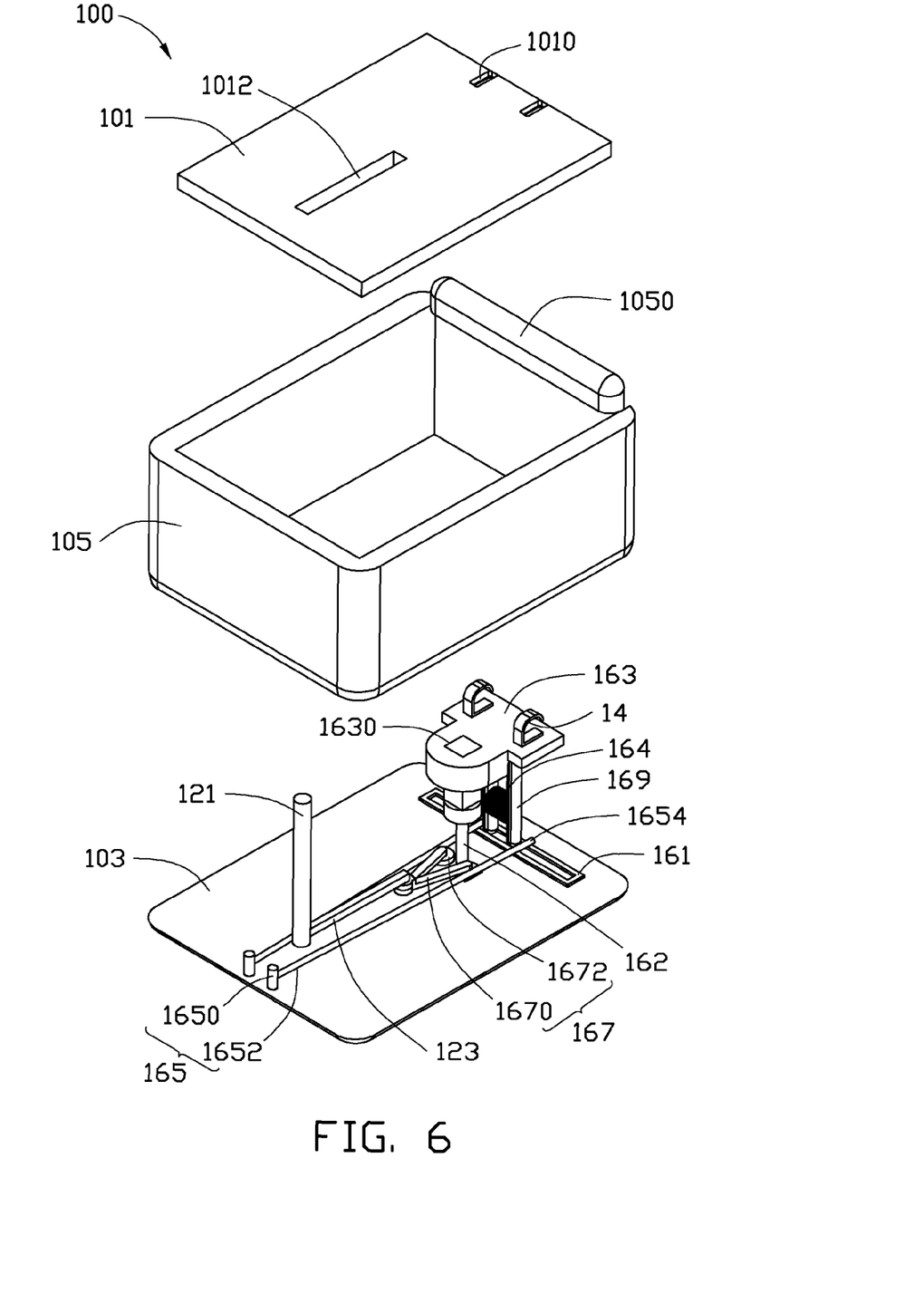
FIG. 6 is an exploded view of the battery charger of FIG. 5.

When the rocker 121 of the driving member 12 is pulled along the slot 1012, the two transmission parts 1670 of the second transmission member 167 rotate at the two corresponding connecting parts 1672 to collapse towards each other. The two rotatable rods 1652 of the first transmission member 165 are rotated by the two connecting parts 1672 respectively. The two rotatable rods 1652 push the two third transmission members 169 together. The platform 163 is raised up along the guiding member 162 and the elastic member 164 is deformed accordingly. When the distance between the rocker 121 and the protrusive board 1050 is great enough for the battery charger 100 to receive the battery 200, the platform 163 contacts the top wall 101, and the contacts 14 protrude from the top wall 101 after passing through the corresponding through holes 1010 and make electrical contact with the battery 200 (see FIGS. 5 and 6, the battery 200 not shown). The battery 200 is clamped between the rocker 121 and the protrusive board 1050.

The movement path of the rocker 121 of the driving member 12 is a straight line and is perpendicular with the protrusive board 1050.

When the battery 200 is removed from the battery charger 100, the force of the rocker 121 of the driving member 12 is withdrawn, and the compressed elastic member 164 returns to a relaxed state. The relaxed elastic member 164 drives the transmission mechanism 16 and the driving member 12 to retract causing the platform 163 to lower along the guiding member 162. The contacts 14 return back into the housing 10 by passing through the corresponding through holes 1010 (see FIGS. 3 and 4). Thus, the contacts 14 of the battery charger 100 in their retracted state making them safe from being inadvertently short circuited, and the life of the battery charger 100 and the battery 200 may be extended.

In this embodiment, the action radius of the two rotatable rods 1652 is restricted by the length of the two transmission parts 1670. Thus, the two rotatable rods 1652 are dependent on the frame 161.

In other embodiments, the frame 161 can be removed, and the recess 1610 is defined on the bottom wall 103.

In other embodiments, the elastic member 164 can be removed. The transmission mechanism 16 and the driving member 12 are reset by the gravity and the weight of the platform 163.

Figure 7:
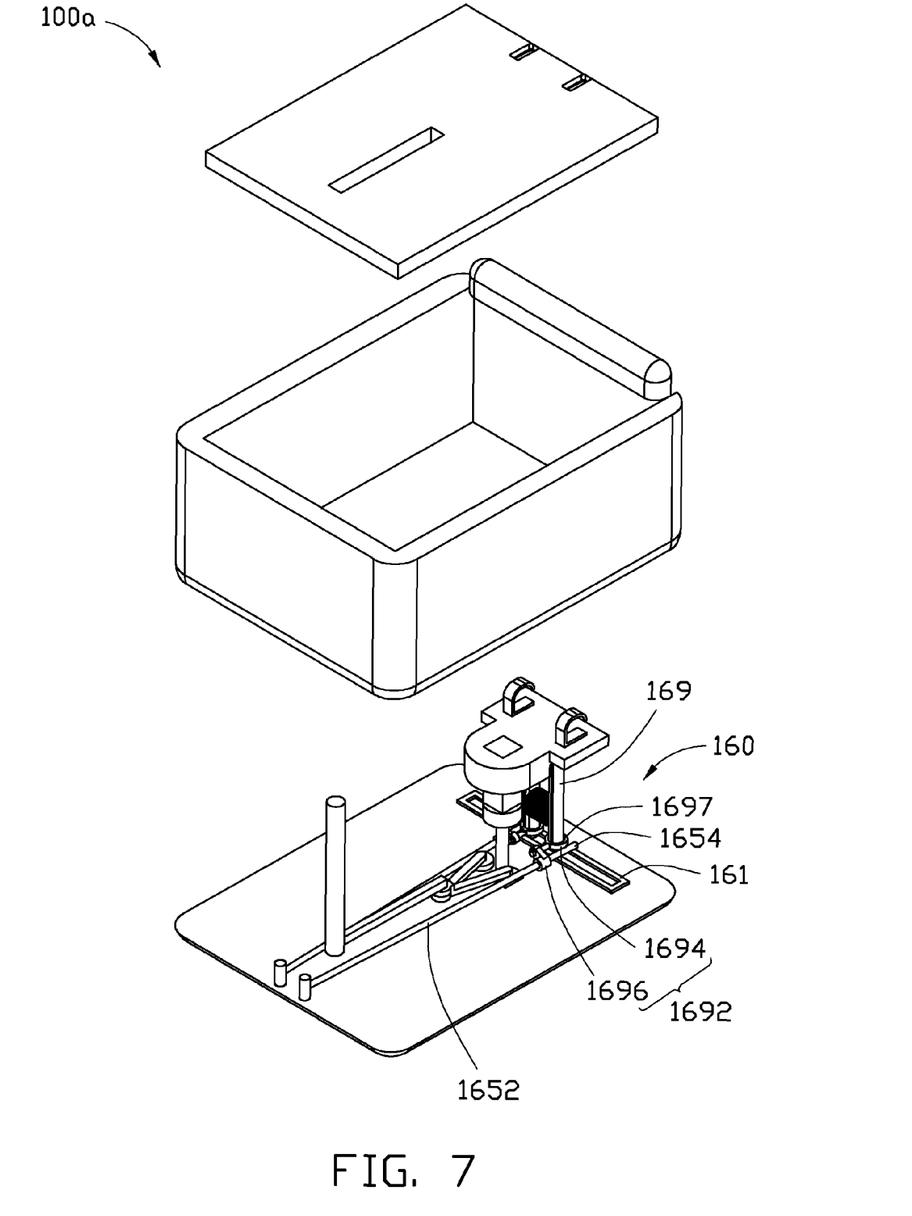
FIG. 7 is an exploded view of a battery charger according to another exemplary embodiment.

Referring to FIG. 7, a battery charger 100a according to another exemplary embodiment is illustrated. The difference between the two battery chargers 100 and 100a is that the battery charger 100a further includes two locking members 1692.

The two locking members 1692 are used for locking the two rotatable rods 1652 and the two third transmission members 169. Each two locking member 1692 includes a first locking portion 1694 and a second locking portion 1696 rotatably connected to the first locking portion 1694. Each of the first locking portion 1694 and the second locking portion 1696 defines a through hole 1697. The two first locking portions 1694 are sleeved on the two third transmission members 169 by the corresponding through holes 1697. The two second locking portions 1696 are sleeved on the two rotatable rods 1652 by the other corresponding through holes 1697. Thus, the two rotatable rods 1652 cannot move independent of the frame 161.

The advantage of the battery charger 100a is similar with the battery charger 100.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A battery charger, comprising:
   a housing, the housing defining a slot and through holes;
   at least two contacts, the at least two contacts received in the housing and operable to protrude out of the housing after passing through the through holes;
   a transmission mechanism, the transmission mechanism received in the housing and for driving the at least two contacts to protrude out of the housing; and
   a driving member, the driving member received in the housing and partially extending out of the housing after passing through the slot, the driving member capable of sliding in the slot and activating the transmission mechanism.

2. The battery charger of claim 1, wherein the housing comprising a protrusive board extending from one edge of the housing, the through holes are located between the slot and the protrusive board, the movement path of the driving member is a straight line and is perpendicular with the protrusive board.

3. The battery charger of claim 1, wherein the transmission mechanism comprises:
   a platform for carrying the at least two contacts;
   a guiding member standing inside of the housing after passing through the platform; and
   a transmission assembly for driving the platform to actuate along the guiding member subsequently bringing the contacts in and out of the housing.

4. The battery charger of claim 3, wherein the transmission assembly comprises:
   a first transmission member;
   a second transmission member, the second transmission member is driven by the driving member to drive the first transmission member; and
   a third transmission member, the third transmission member is driven by the first transmission member to drive the platform to actuate along the guiding member.

5. The battery charger of claim 4, wherein the transmission assembly further comprises a frame, the frame defines a recess, the recess is substantially rectangular and is for receiving and guiding the third transmission member.

6. The battery charger of claim 4, wherein the housing comprises:
   a top wall;
   a bottom wall parallel to the top wall, the bottom wall defining a recess, the recess is substantially rectangular and is for receiving and guiding the third transmission member; and
   a side wall connecting the top wall to the bottom wall, a protrusive board extending from the edge of the side wall.

7. The battery charger of claim 6, wherein the driving member comprises:
   a rocker guided by the slot, the rocker positioned on the bottom wall and partially extending out of the top wall by passing through the slot; and
   a connecting portion used for connecting the rocker to the transmission mechanism.

8. The battery charger of claim 6, wherein the first transmission member comprises a fixing portion and a rotatable rod, the fixing portion is attached on the bottom wall, one end of the rotatable rod is fixed on the fixing portion, and the other end of the rotatable rod is moveably positioned on the third transmission member to push the third transmission member.

9. The battery charger of claim 8, wherein the transmission assembly further comprises a locking member used for moveably locking the rotatable rod and the third transmission member.

10. The battery charger of claim 6, wherein the second transmission member comprises a transmission part and a connecting part, one end of the transmission part is rotatably connected to the driving member, the other end of the transmission part is rotatably connect with the connecting part, the connecting part is fixed on the first transmission member.

11. The battery charger of claim 6, wherein one end of the third transmission member is rotatably connected to the platform, and the other end of the third transmission member moveably received in the recess, the third transmission member is operable to be pushed by the first transmission member.

12. The battery charger of claim 11, wherein the transmission assembly further comprises another third transmission member and an elastic member, the elastic member is connected between the two third transmission members, when two third transmission members move towards each other, the elastic member is deformed, when the force of the two third transmission members withdraws, the deformed elastic member resets the transmission mechanism and the driving member.

13. A battery charger, comprising:
a housing;
at least two contacts capable of being selectively located between a first state hidden by the housing, and a second state protruding out of the housing;
a transmission mechanism adapted to carry the at least two contacts, the transmission mechanism being received in the housing; and
a driving member for driving the transmission mechanism, the driving member partially received in the housing and partially extending out of the housing, the driving member capable of sliding with respect to the housing to selectively locate at a first position and a second position; the at least two contacts being in the first state when the driving member is in the first position, and being in the second state when the driving member is in the second position.

14. The battery charger of claim 13, wherein the transmission mechanism comprises:
a platform for carrying the at least two contacts;
a guiding member standing inside of the housing after passing through the platform; and
a transmission assembly for driving the platform to actuate along the guiding member subsequently bringing the contacts in and out of the housing, the transmission assembly comprising:
a first transmission member;
a second transmission member, the second transmission member is driven by the driving member to drive the first transmission member; and
a third transmission member, the third transmission member is driven by the first transmission member to drive the platform to raise or lower along the guiding member.

15. The battery charger of claim 14, wherein the first transmission member comprises a fixing portion and a rotatable rod, the fixing portion is attached on a bottom wall of the housing, one end of the rotatable rod is fixed on the fixing portion, and the other end of the rotatable rod is moveably received in a recess defined on the bottom wall, the recess is substantially rectangular and is for receiving and guiding the third transmission member.

16. The battery charger of claim 15, wherein the second transmission member comprises a transmission part and a connecting part, one end of the transmission part is rotatably connected to the driving member, the other end of the transmission part is rotatably connected with the connecting part, the connecting part is fixed on the rotatable rod of the first transmission member.

17. The battery charger of claim 16, wherein one end of the third transmission member is rotatably connected to the platform, and the other end of the third transmission member is moveably received in the recess, the third transmission member is operable to be pushed by the rotatable rod of the first transmission member.

18. A battery charger used for charging a battery, the battery charger comprising:
a housing, the housing defining a slot, the housing comprising a protrusive board extending from one edge of the housing;
at least two contacts, the at least two contacts received in the housing and operable to protrude out of the housing for electrically connecting to the battery;
a transmission mechanism, the transmission mechanism received in the housing and for driving the at least two contacts to protrude out of the housing to make electrical contact with the battery; and
a driving member, the driving member received in the housing and partially extending out of the housing after passing through the slot, the driving member capable of sliding in the slot and activating the transmission mechanism, and also for clamping the battery under the help of the protrusive board.

19. The battery charger of claim 18, wherein the transmission mechanism comprises:
a platform for carrying the at least two contacts;
a guiding member standing inside of the housing after passing through the platform; and
a transmission assembly for driving the platform to actuate along the guiding member subsequently bringing the contacts in and out of the housing, the transmission assembly comprising:
a first transmission member;
a second transmission member, the second transmission member is driven by the driving member to drive the first transmission member; and
a third transmission member, the third transmission member is driven by the first transmission member to drive the platform to raise or lower along the guiding member.

20. The battery charger of claim 19, wherein the housing comprises a top wall, a bottom wall parallel to the top wall, and a side wall connecting the top wall to the bottom wall, the protrusive board extends from the edge of the side wall, the bottom wall defines a recess, the driving member comprises a rocker guided by the slot, and a connecting portion connected the rocker to the transmission mechanism, the rocker is positioned on the bottom wall and partially extending out of the housing by passing through the slot.

* * * * *